US012573110B2

(12) United States Patent
Li

(10) Patent No.: US 12,573,110 B2
(45) Date of Patent: *Mar. 10, 2026

(54) LIVE STREAMING SHOPPING EXPERIENCE

(71) Applicant: CommentSold, LLC, Huntsville, AL (US)

(72) Inventor: Danielle Li, Los Angeles, CA (US)

(73) Assignee: CommentSold, LLC, Huntsville, AL (US)

( * ) Notice: Subject to any disclaimer, the term of this patent is extended or adjusted under 35 U.S.C. 154(b) by 19 days.

This patent is subject to a terminal disclaimer.

(21) Appl. No.: 18/511,556

(22) Filed: Nov. 16, 2023

(65) Prior Publication Data

US 2024/0087197 A1     Mar. 14, 2024

Related U.S. Application Data

(63) Continuation of application No. 17/028,851, filed on Sep. 22, 2020, now Pat. No. 11,823,311, which is a continuation of application No. 17/008,445, filed on Aug. 31, 2020, now abandoned.

(51) Int. Cl.
| | |
|---|---|
| *G06T 11/60* | (2006.01) |
| *G06Q 30/0601* | (2023.01) |
| *H04N 21/2187* | (2011.01) |
| *H04N 21/254* | (2011.01) |
| *H04N 21/478* | (2011.01) |

(52) U.S. Cl.
CPC .......... *G06T 11/60* (2013.01); *G06Q 30/0633* (2013.01); *G06Q 30/0643* (2013.01); *H04N*
*21/2187* (2013.01); *H04N 21/2542* (2013.01); *H04N 21/47815* (2013.01)

(58) Field of Classification Search
CPC ........................... G06T 11/60; G06Q 30/0633; G06Q 30/0643; H04N 21/2187; H04N 21/2542; H04N 21/47815
See application file for complete search history.

(56) References Cited

U.S. PATENT DOCUMENTS

| | | | | |
|---|---|---|---|---|
| 9,973,819 B1 * | 5/2018 | Taylor | ................ | G06Q 30/0643 |
| 2020/0334742 A1 * | 10/2020 | Stewart | .............. | H04L 65/4015 |
| 2022/0239988 A1 * | 7/2022 | Yang | .................. | H04N 21/4725 |

* cited by examiner

*Primary Examiner* — Sumaiya A Chowdhury
(74) *Attorney, Agent, or Firm* — Cognition IP, P.C.; Edward Steakley; Rajesh Fotedar

(57) ABSTRACT

Methods, systems and computer products as described herein are directed to a Live Listing Engine. Live Listing Engine sends a live video stream to a viewer computer device and a host computer device. The live video stream includes a view of an item from a perspective of the host computer device. The Live Listing Engine receives an upload of an image of the view of the item captured from a preview window rendered on the host computer device. The Live Listing Engine receives listing information associated with the image from the host computer device. The Live Listing Engine generates a listing thumbnail based on the image and the listing information and inserts the listing thumbnail into the live video stream for display at the viewer computer device and the host computer device.

17 Claims, 10 Drawing Sheets

SHOW HOST         VIEWER

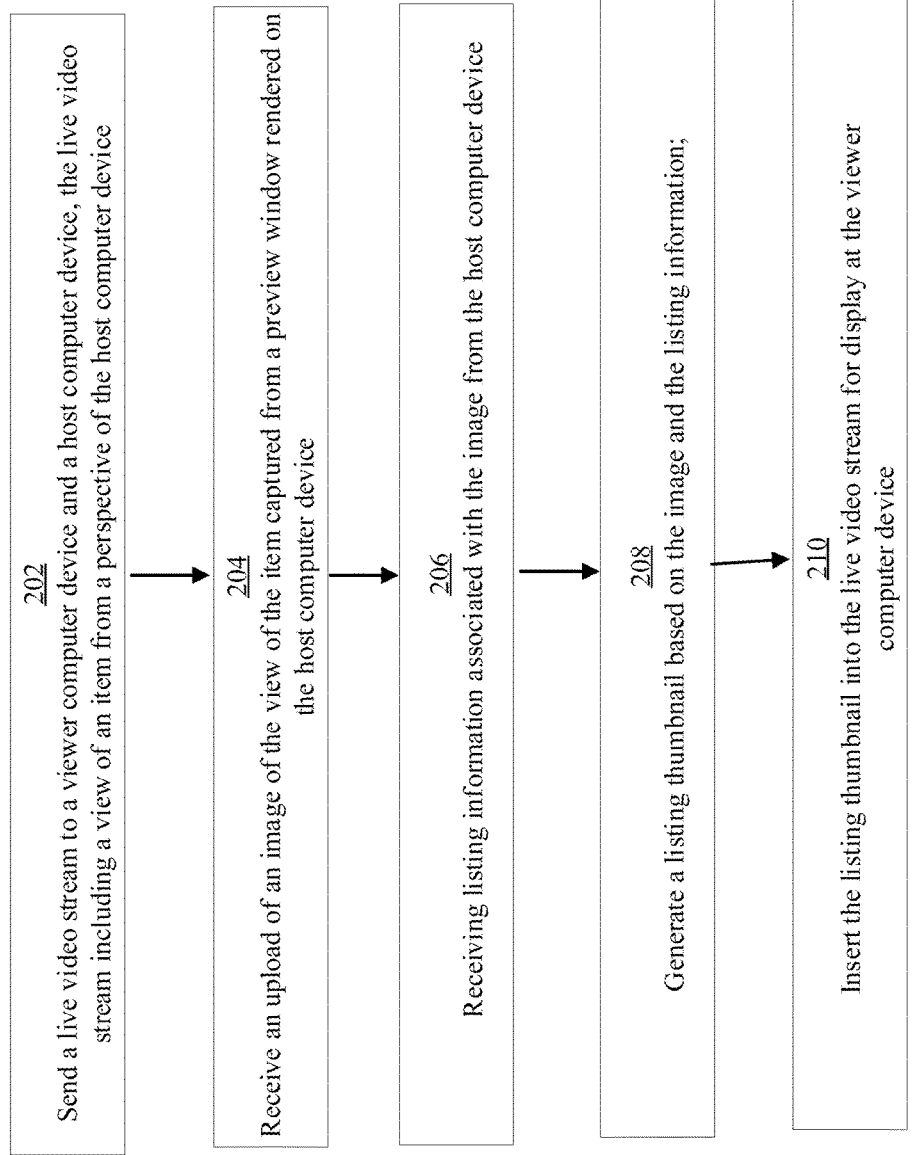

200

202
Send a live video stream to a viewer computer device and a host computer device, the live video stream including a view of an item from a perspective of the host computer device 204
Receive an upload of an image of the view of the item captured from a preview window rendered on the host computer device 206
Receiving listing information associated with the image from the host computer device 208
Generate a listing thumbnail based on the image and the listing information;

210
Insert the listing thumbnail into the live video stream for display at the viewer computer device

FIG. 2

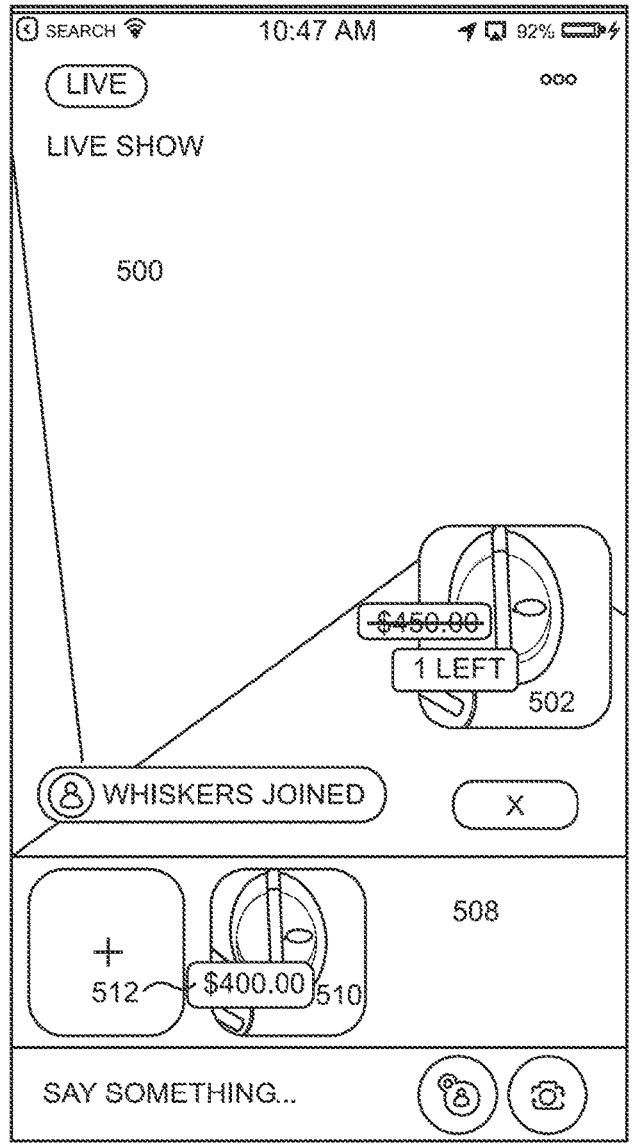
SHOW HOST
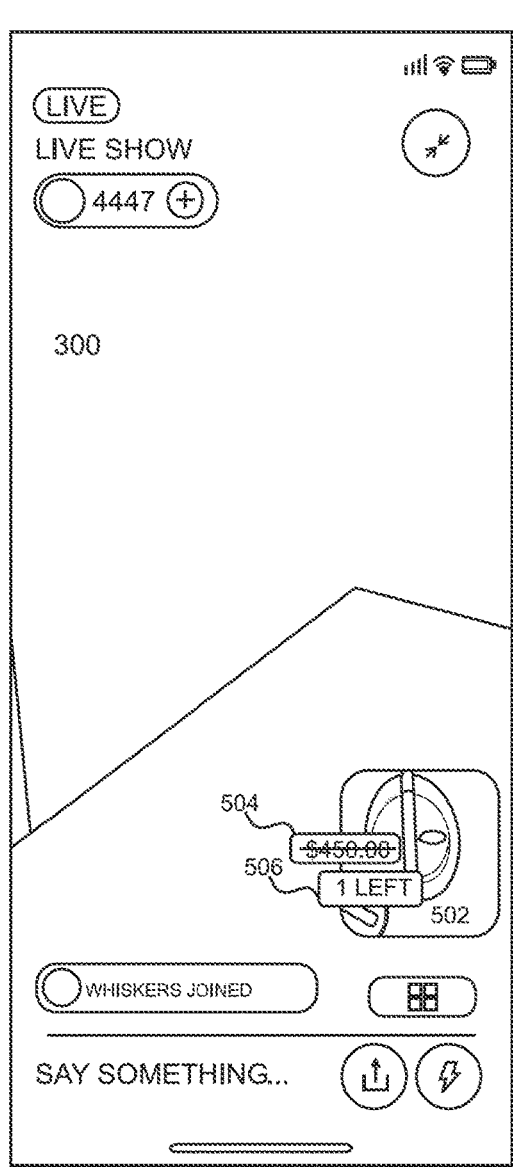
VIEWER
FIG. 5

VIEWER

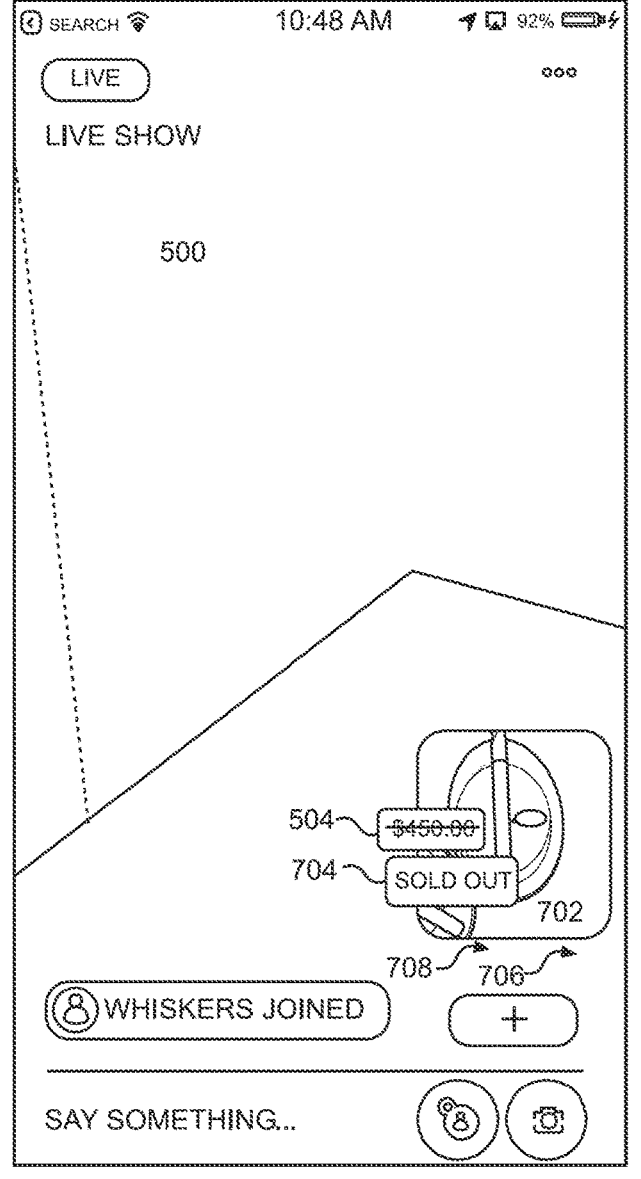
SHOW HOST
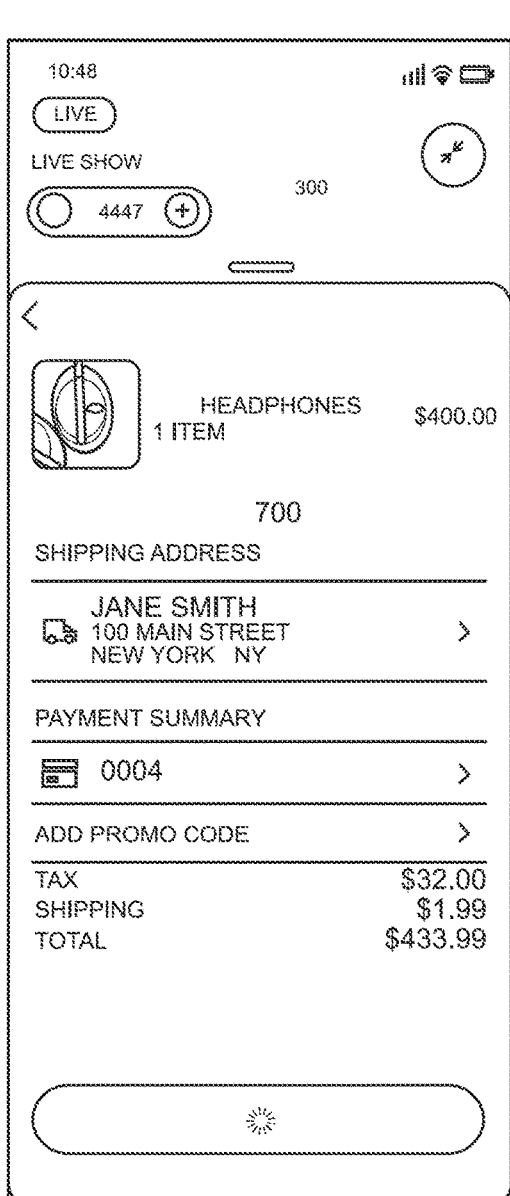
VIEWER
FIG. 7

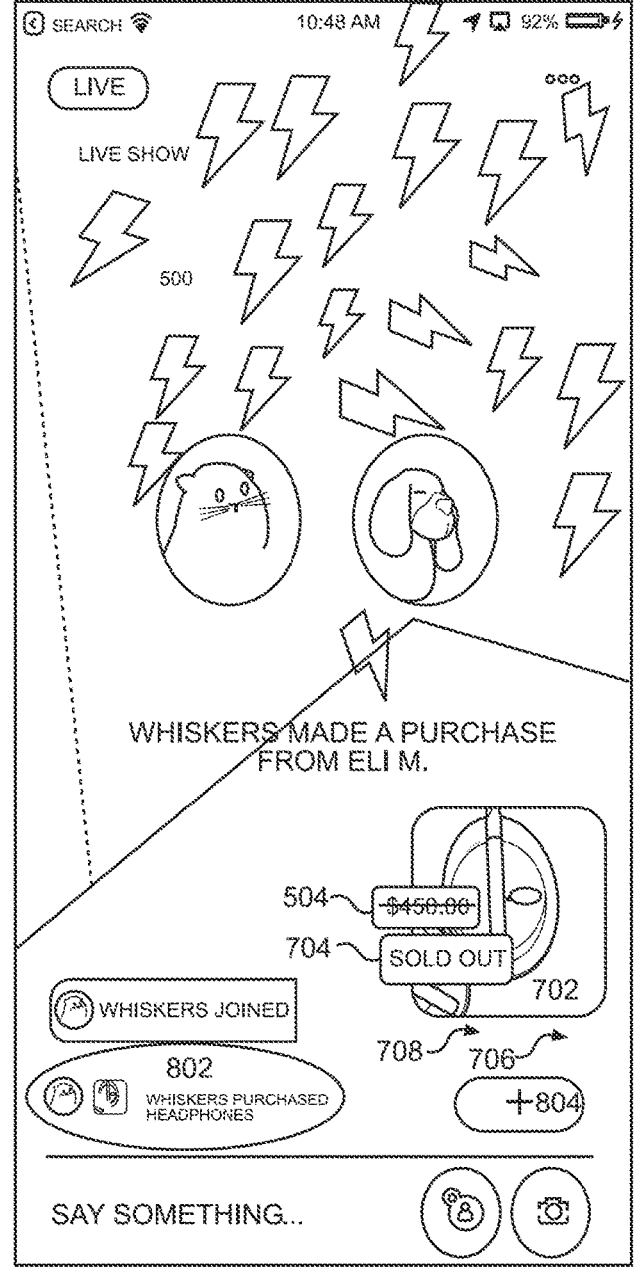
SHOW HOST
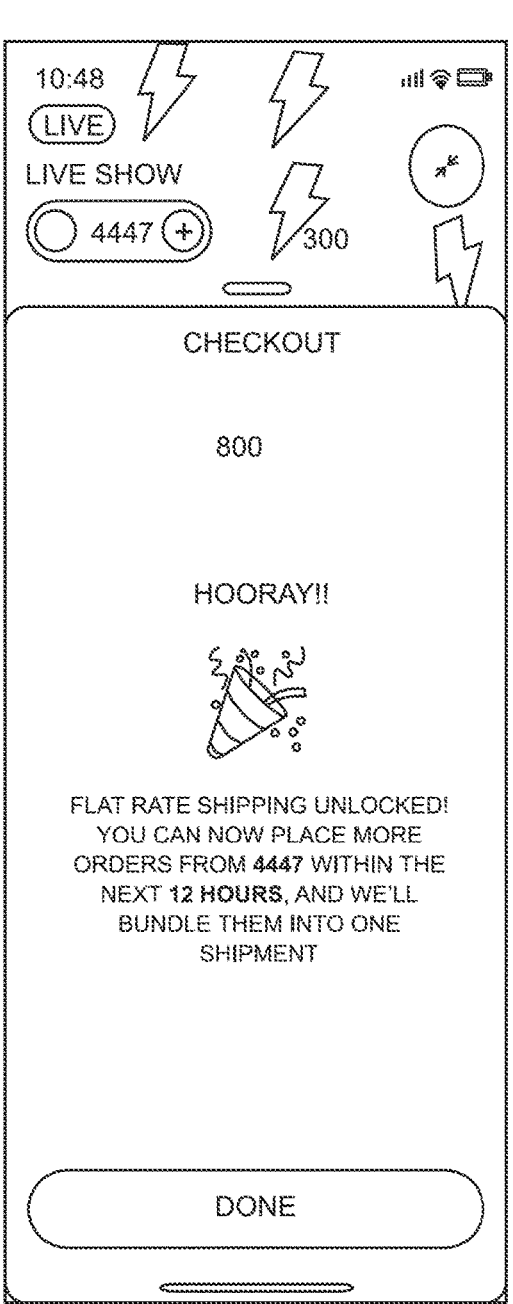
VIEWER
FIG. 8

LIVE STREAMING SHOPPING EXPERIENCE

CROSS-REFERENCE TO RELATED APPLICATIONS

This application is a continuation of U.S. patent application Ser. No. 17/028,851, filed on Sep. 22, 2020, which is a continuation of U.S. patent application Ser. No. 17/008,445, filed on Aug. 31, 2020, which are hereby incorporated by reference in their entirety.

BACKGROUND

Live video streaming allows for video data to be sent to multiple computer devices for display at each computer device. Various websites allow for channels associated with a primary user account that is a source of produced content, either as recorded content for later playback or as content produced in real-time or on-demand. Such conventional channels further allow for other user accounts to submit comments to a webpage associated with the channel and/or send messages to the primary user account during distribution of real-time or on-demand content.

SUMMARY

Further areas of applicability of the present disclosure will become apparent from the detailed description, the claims and the drawings. The detailed description and specific examples are intended for illustration only and are not intended to limit the scope of the disclosure.

Methods, systems and computer products as described herein are directed to a Live Listing Engine for adding a listing of an item(s) for sale "on the fly" during a live video stream. According to various embodiments, the item listing may be generated "on the fly" by a host of a live video stream after the host has displayed a view of the item to an audience of the live video stream. Such "on the fly" generation of the item listing occurs concurrently with the host's live video stream and the live video stream is uninterrupted as the host generates the item listing at the host's computer device and as an icon (or thumbnail) of the item listing is inserted in the live video stream for display to the audience.

According to various embodiments, the Live Listing Engine provides a host of a live video stream with one or more functionalities to display a view of an item from the perspective of a camera of the host's computer device during a live video stream. The view of the item may be displayed in the live video stream before the host creates a listing for the sale of that item. By providing the view of the item to one or more viewers of the live video stream, the host is afforded an opportunity to discern whether the viewers are interested in purchasing the item before the host has to invest time and effort populating an e-Commerce sales system with information to the support the item's sale. If the hosts decides to sell the item, the Live Listing Engine provides functionalities for creating an item sales listing "on the fly" by generating a thumbnail based on the host computer device's view of the item and listing information provided by the host during the live video stream. The Live Listing Engine inserts the thumbnail into the live video stream and a viewer(s) may thereby select (i.e. tap) the displayed thumbnail in order to purchase the item. It is understood that a host may be an end-user of the host computer device and a viewer may be an end-user of the viewer computer device. The host computer device and the viewer computer device may each be a mobile computer device. There may be any number of viewers and the host may sell any type of item. An item listing may be for a sale of a physical product or a service. For example, a listing for a service may be to sell a digital service provided during an online session.

According to various embodiments, a view of an item from a perspective of a camera of the host computer device may be displayed within a graphical user interface at the host computer device. Video data is sent from the host computer device in order for display of the view of the item within respective graphical user interfaces of viewer computer devices. The Live Listing Engine receives the video data from the host computer device. The Live Listing Engine generates a live video stream based on the host computer device's video data. The live video stream thereby may include the video data received from the host computer device and stream data, such as one or more inserted thumbnails, notifications, functionalities, etc. As such, the live video stream sent from the Live Listing Engine to the host computer device may be based on the stream data (i.e. inserted thumbnails, notifications, functionalities) without the video data since the video data originates from the host computer device and will be displayed at the host computer device via the camera. The live video stream sent from the Live Listing Engine to a viewer computer device(s) will be based on the video data and stream data.

According to various embodiments, the host computer device initiates upload of an image of an item to the Live Listing Engine. As the Live Listing Engine receives the upload, the live video stream is still being delivered to the host and viewer computer devices. Listing information may further be input at the host computer device while the image upload is in progress. The listing information may include an item name, price and inventory (i.e. quantity available for purchase). According to various embodiments, a resolution of the uploaded image of an item may be a resolution associated with a displayed view of the item in a camera preview window.

The Live Listing Engine generates a first thumbnail with one or more graphical overlays based on the listing information. The Live Listing Engine may receive updated listing information from the host computer device and may further generate an updated first thumbnail based on the updated listing information.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 2 is a flowchart illustrating exemplary methods that may be performed in some embodiments.

FIG. 5 is a diagram illustrating an exemplary environment in which some embodiments may operate.

FIG. 7 is a diagram illustrating an exemplary environment in which some embodiments may operate.

FIG. 8 is a diagram illustrating an exemplary environment in which some embodiments may operate.

DETAILED DESCRIPTION

Figure 1:
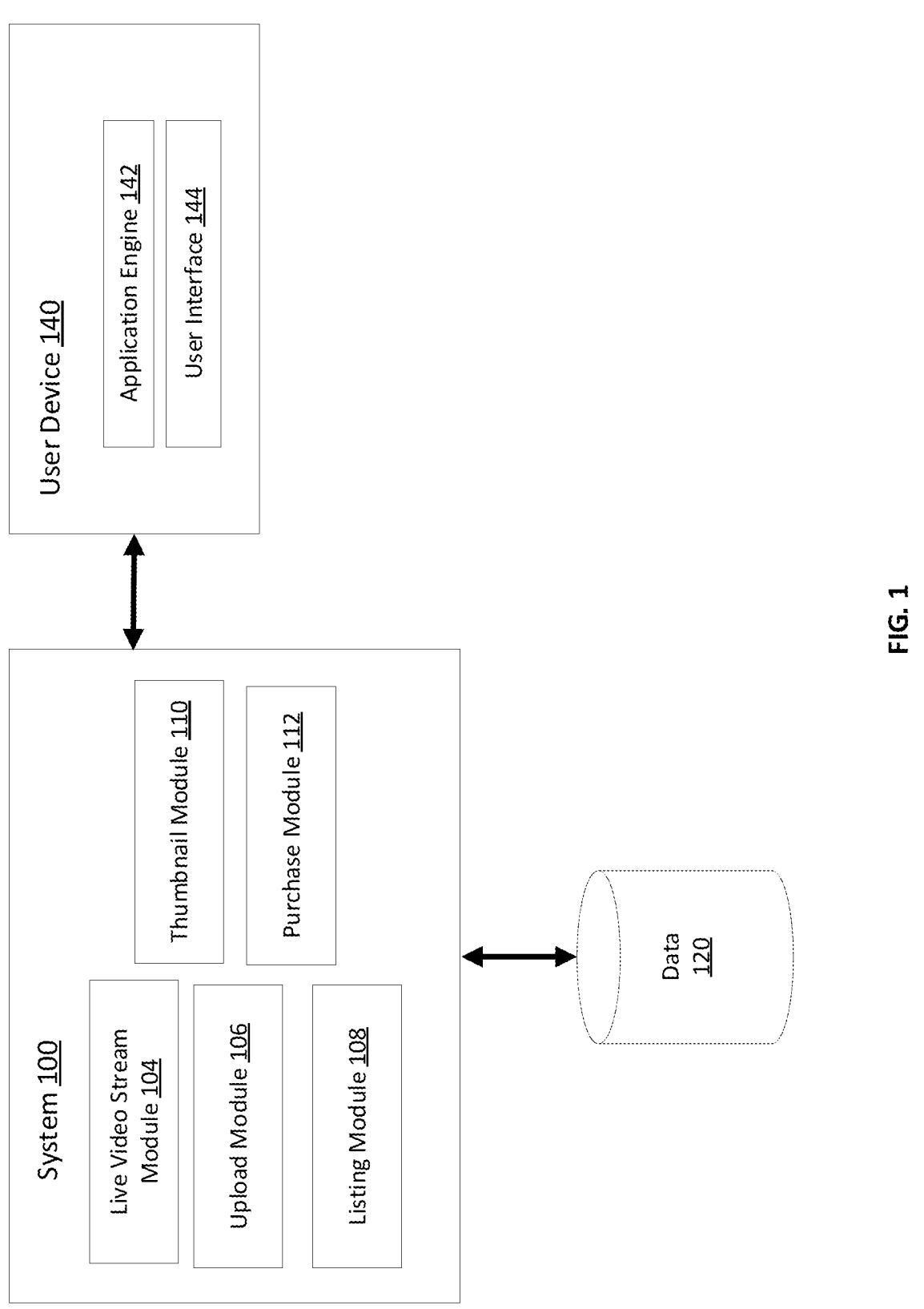
FIG. 1 is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1 is a diagram illustrating an exemplary environment in which some embodiments may operate. FIG. 1 illustrates a block diagram of an example system 100 that includes a live video stream module 104, an upload module 106, a listing module 108, a thumbnail module 110 and a purchase module 112. The system 100 may communicate with a user device 140 via a network to display output, via a user interface 144 generated by an application engine 142. The database 120 may further be a component of the system 100 and may be implemented in any manner that promotes retrieval and storage efficiency, privacy and/or data security.

The live video stream module 104 of the system 100 may perform functionality for as illustrated in FIGS. 2, 3, 4, 5, 6, 7, 8 and 9.

Figure 3:
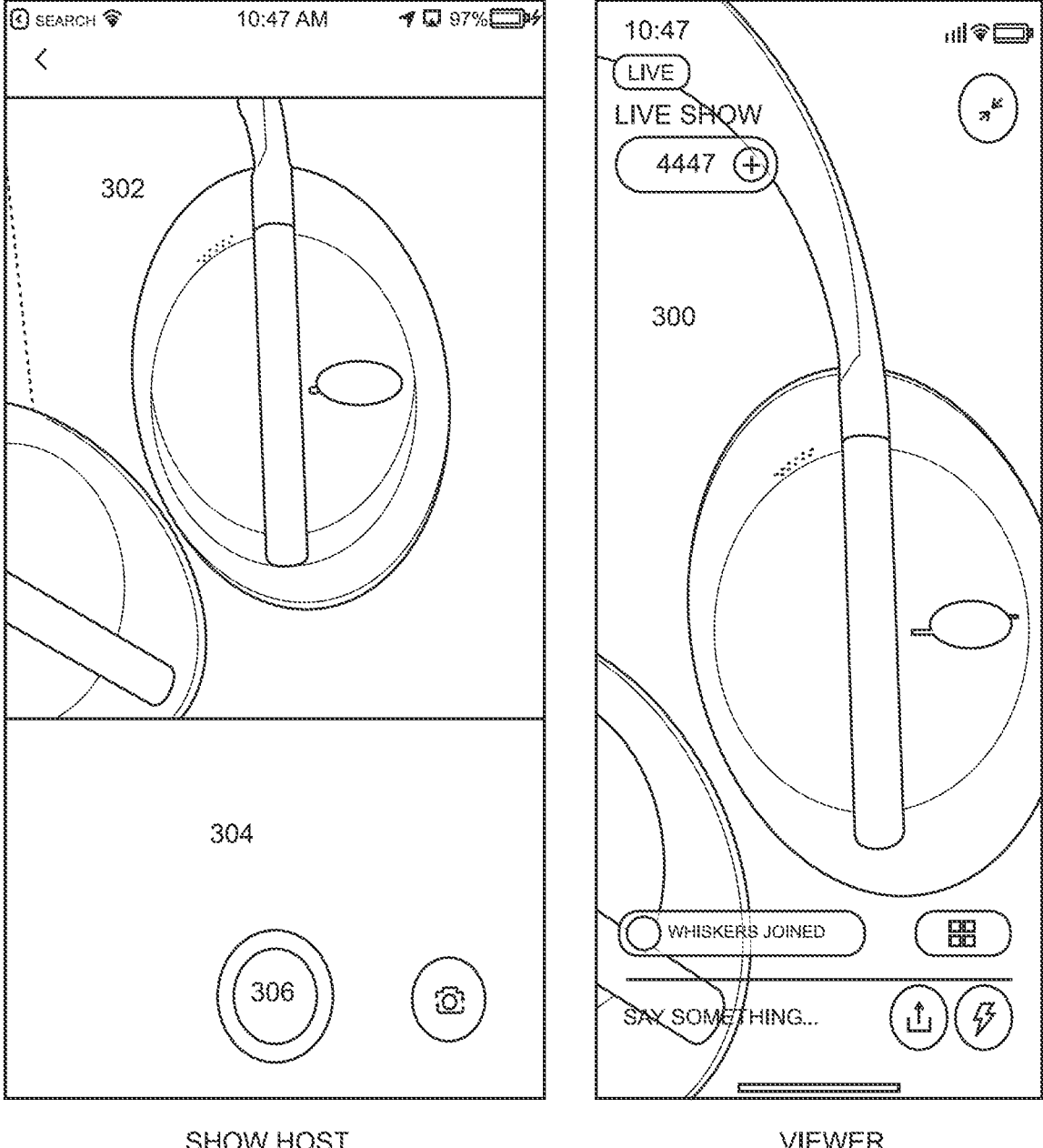
FIG. 3 is a diagram illustrating an exemplary environment in which some embodiments may operate.
Figure 4:
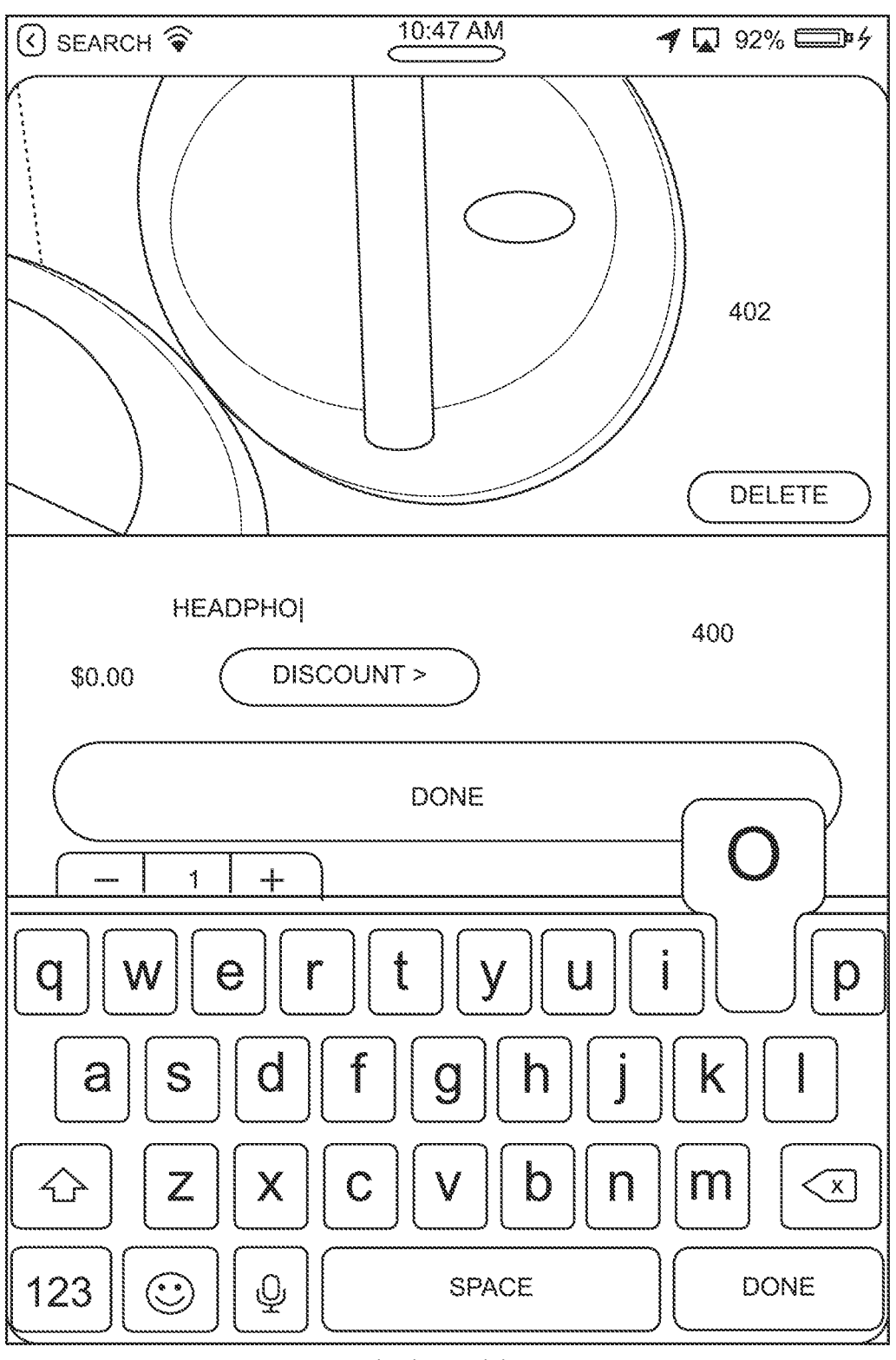
FIG. 4 is a diagram illustrating an exemplary environment in which some embodiments may operate.

The upload module 106 of the system 100 may perform functionality for as illustrated in FIGS. 2, 3 and 4.

The listing module 108 of the system 100 may perform functionality for as illustrated in FIGS. 2 and 4.

The thumbnail module 110 of the system 100 may perform functionality as illustrated in FIGS. 2, 5, 7, 8 and 9.

Figure 6:
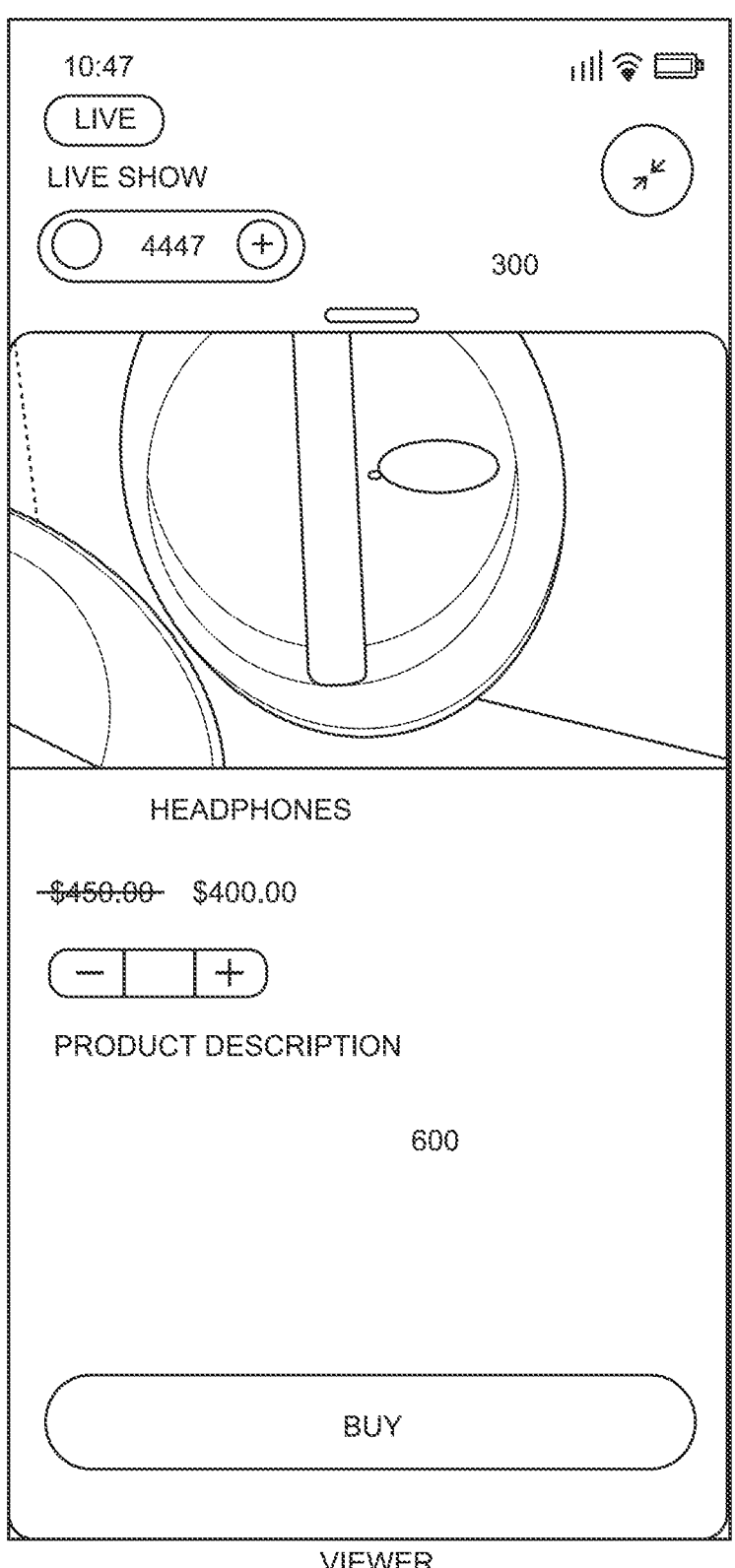
FIG. 6 is a diagram illustrating an exemplary environment in which some embodiments may operate.

The purchase module 112 of the system 100 may perform for functionality as illustrated in FIGS. 6, 7 and 8.

It is understood that execution of one or more operations, steps and/or acts described herein may be performed by the system 100, the application engine 142 and/or distributed across the system 100 and the application engine 142.

As shown in the flowchart 200 in FIG. 2, the Live Listing Engine sends a live video stream to a viewer computer device(s) and a host computer device (Act 202). The live video stream includes a view of an item from a perspective of a camera of the host computer device. The host computer device captures an image of the view of the item while the view of the item is included in the live video stream. According to various embodiments, the view of the item may be a view via an image preview window. The resolution of the image may correspond to a resolution of the image preview window.

The Live Listing Engine receives an upload of an image of the view of the item captured from a preview window rendered on the host computer device (Act 204). The Live Listing Engine receives listing information associated with the image from the host computer device (Act 206). The Live Listing Engine generates a listing thumbnail based on the image and the listing information (Act 208) and inserts the listing thumbnail into the live video stream for display at the viewer computer device and the host computer device (Act 210).

According to various embodiments, the Live Listing Engine receives a request to purchase the item based on a selection of the listing thumbnail displayed at the viewer computer device during the live video stream. The purchase may be a purchase of the item by a viewer to be sent to a physical address of that viewer. In some embodiments, the purchase may be a gift purchase of the item by a first viewer to be sent to a physical address of a second viewer upon receiving the second viewer's approval (or acceptance) of the gift. It is understood that all the features, operations and steps described herein may be performed while the live video stream is being sent to the viewer and host computer devices.

According to various embodiments, one or more acts of the exemplary flowchart may be initiated in response to one or more voice commands. For example, a person who is the host of the live video stream may speak a voice command such as "Create listing" proximately to a microphone of the host computer device. Upon detecting the voice command, Live Listing Engine module operating on the host computer device may initiate an "on the fly" listing creation sequence based on flowchart 200.

It is understood that some of the acts of exemplary flowchart 200 may be performed in different orders or in parallel. Also, one or more of the acts in the exemplary flowcharts 200 and 320 may occur in two or more computers, for example if the method is performed in a networked environment. Various acts may be optional. Some acts may occur on local computer with other acts occur on a remote computer.

According to a peer-to-peer embodiment, the Live Listing Engine may be one or more modules distributed across the host computer device and one or more viewer computer devices that work in coordination with each other to execute the operations, steps and acts described therein. For example, a Live Listing Engine module operating on the host computer device may send video data directly to one or more viewer computer devices. A Live Listing Engine module operating at respective viewer computer device may receive the video data and incorporate the video data with stream data for display in a graphical user interface at the respective viewer computer device.

Stream data may be generated by a Live Listing Engine module operating on any computer device (i.e. host and viewer) and sent to all other associated Live Listing Engine modules operating on other computer devices. For example, an item image may be captured at the host computer device and the Live Listing Engine module operating on host computer device may generate the listing thumbnail for the item and send the listing thumbnail to the Live Listing Engine modules operating on other computer devices. A purchase transaction for the item may be executed by a Live Listing Engine module operating on a viewer computer device, which further sends a purchase notification to the Live Listing Engine module operating on the host computer device. In response to the purchase notification, the Listing Engine module operating on the host computer device may update listing information associated with the item stored at the host computer. In other embodiments, the listing information may be stored at a data repository remote from the host computer device. The Live Listing Engine module operating at the host computer device may forward the purchase notification to the remote data repository to update the item's listing information stored at the remote data repository. In another embodiment, the Live Listing Engine module operating at the viewer computer device may send the purchase notification directly to the remote data repository to update the item's listing information stored at the remote data repository.

The Live Listing Engine module operating at the host computer device may receive the updated listing information and may generate an updated listing thumbnail for the sale of the item based on the updated listing information due to the purchase notification. For example, the updated listing information may modify the inventory information associated with the sale of the item and the updated listing thumbnail generated by the Live Listing Engine module operating at the host computer device may reflect a change in inventory. The Live Listing Engine module operating at the host computer device thereby sends the updated listing thumbnail and current video data to the Live Listing Engine modules operating at the respective viewer computer devices. For example, the Live Listing Engine module operating at the host computer may insert the updated listing thumbnail into the video data in order to generate the live video stream and send the live video stream to the Live Listing Engine modules operating at the respective viewer computer devices.

As shown in FIG. 3, Live Listing Engine sends a live video stream to a viewer computer device and a host computer device. The live video stream includes a view of an item, such as a pair of headphones, from a camera associated with a host computer device. The live video stream is displayed in a graphical user interface (GUI) 300 at the viewer computer device. The view of the item, captured by the host computer device, is included in the live video stream displayed in the viewer's GUI 300.

A host of the live video stream intends to offer the pair of headphones for sale during the live video stream. However, the host has not created a listing for the sale of the pair of headphones prior to showing the pair of headphones to the viewers of the live video stream. The host selects an image functionality associated with the host computer device. A preview window GUI 302 is displayed on the host computer device during the live video stream but is not displayed to the viewers of the live video stream. The preview window GUI 302 includes the view of the pair of headphones from the host computer device's camera. The preview window GUI 302 portrays of preview of an image of the headphones that may be captured at the host computer device. The preview window GUI 302 is further accompanied by an image capture region 304 that includes a selectable functionality 306 to trigger capture of an image of the host computer device camera's current view of the headphones.

Upon capture of the image, the host computer device initiates an upload of the image during the live video stream. The uploaded image is based on a preview image of the headphones rendered in the preview window. In other embodiments, the host computer device may capture a video clip, such as a short video clip, for example, with a duration of 2-3 seconds. The video clip may be uploaded to the Live Listing Engine during the live video stream and the video clip may be used for dynamic thumbnail generation instead of an image. It is understood that various embodiments may generate a thumbnail(s) for a listing based on an image(s), a .gif file(s) and/or a video file(s).

As shown in FIG. 4, the host populates listing information at the host computer device to be associated with the headphones while the image 402 of the headphones is uploaded to the Live Listing Engine. A listing GUI 400 includes display of the image 402 of the headphones and one or more fields to include various types of listing information, such as listing title, price information, discount price information and quantity (i.e. inventory). For example, the host inputs the listing title as the Live Listing Engine receives a portion of the upload of the image 402. The price for the headphones may be input as $450.00 while a discount price may be input as $400.00. When the listing information is complete, the host computer device sends the listing information to the Live Listing Engine. The quantity (i.e. inventory) information may the amount of one ("1") in the case of the host having only one pair headphones for sale. During the live video stream, the Live Listing Engine creates and stores a listing for the sale of the headphones based on the image 402 and the listing information.

While streaming the live video stream to various computer devices, the Live Listing Engine generates a thumbnail of the image and inserts the thumbnail into the live video stream such that the thumbnail is displayed, for example, in the live video stream GUI 300 of the viewer computer device and a live video stream GUI 500 of the host computer device. For example, the live video stream may still include a current view of the headphones from the host computer device's camera while the Live Listing Engine generates the thumbnail. For example, the image uploaded to the Live Listing Engine for the thumbnail may be based on a first view of the headphones from the perspective of the host computer device's camera but the host may have moved or adjusted the host computer device to a different orientation after capturing the image of the first view of the item. While the Live Listing Engine generates the thumbnail, the live video stream may include a second view of the headphones from the perspective of the host computer device's camera according to the different orientation of the host computer device.

The Live Listing Engine generates the thumbnail to include an overlay of a price indicator and an overlay of an inventory indicator. Both indicators are based on price information and inventory information, respectively, stored in the listing for the sale of the headphones. For example, an initial thumbnail for the sale of the headphones may include an overlay price indicator that displays the price of $450.00 and an overlay inventory indicator that displays the initial amount ("1") of headphones in the host's possession that are available for purchase by viewers during the live video stream.

In another embodiment, the Live Listing Engine may generate a timestamp for the listing information. The timestamp may represent a time in the live video stream at which the initial thumbnail was inserted into the live video stream. The timestamp may be used by the host and/or viewer(s) during playback of the live video stream. The Live Listing Engine may generate a visual cue based on the timestamp to indicate when an item's corresponding thumbnail was displayed during a timeline of the recorded live video stream.

As shown in FIG. 5, while sending the live video stream with the initial thumbnail to the viewer and host computer devices, the Live Listing Engine may receive updated price information the host computer device. For example, the host (i.e. end user of the host computer device) may select a discount functionality that changes a current price of the headphones to a discount price stored in the listing information. According to another example, the host may input a new price for the headphones, which the Live Listing Engine stores as updated price information in the listing information.

Upon receiving the updated price information, the Live Listing Engine generates a second thumbnail 510 for concurrent display at the host computer device with the live video stream in the live video stream GUI 500. The second thumbnail 510 is presented in a thumbnail preview GUI region 508. The second thumbnail 510 thumbnail includes an overlay 510 of an updated price indicator based on the updated price information. For example, if the host selected a discount price to be applied to the sale of the headphones, then the overlay 510 includes the discount price ($400.00). According to various embodiments, the Live Listing Engine many generate another timestamp for the listing information based on when the headphones were discounted during the live video stream.

According to various embodiments, the Live Listing Engine modifies the initial thumbnail previously inserted into the live video stream due to the updated price information. For example, the Live Listing Engine generates an updated overlay price indicator 504 that modifies a visual appearance of the initial price. The overlay inventory indicator 506 maintains the current number of headphones still available for purchase. The Live Listing Engine generates an updated thumbnail 502 with the respective overlays 504, 506 and inserts the updated thumbnail 502 into the live video stream for display of the updated thumbnail 502 in the viewer's live video stream GUI 300 and the host's live video stream GUI 500. According to various embodiments, the second thumbnail 510 in the thumbnail preview GUI region 508 may be concurrently displayed with the updated thumbnail 502 in the host's live video stream GUI 500.

As shown in FIG. 6, the Live Listing Engine receives a request to purchase the headphones based on a selection of the updated thumbnail 502 displayed in the viewer's live video stream GUI 300. For example, a viewer (end-user) of the viewer computer device may tap on the displayed updated thumbnail 502 to indicate an intent to purchase the headphones. During the live video stream, in response to the request to purchase, the viewer computer device displays a purchase GUI region 600 over a portion(s) of the viewer's live video stream GUI 300 from which the viewer can complete and finalize the purchase request. According to various embodiments, the purchase GUI region 600 includes the image of the headphones and information from the stored listing information that corresponds to the overlays 504, 506.

As shown in FIG. 7, upon finalizing the purchase request, viewer computer device displays a checkout GUI region 700 over a portion(s) of the viewer's live video stream GUI 300. The Live Listing Engine may further update the thumbnail 502 based on finalization of the purchase request via the checkout GUI region 700. For example, the Live Listing Engine may detect that the purchase request resulted in a sale of the last available pair of headphones offered by the host. The Live Listings Engine may update the overlay inventory indicator 506 by generating an updated overlay 704 that indicates that the host no longer has an inventory of headphones ("sold out"). The Live Listings Engine may generate an additional thumbnail 702 that includes the updated overlay 704 and insert the additional thumbnail 702 into the live video stream.

According to various embodiments, the Live Listings Engine may further generate one or more thumbnail layers 706, 708 in response to detecting the host no longer has an inventory of headphones. Each thumbnail layer 706, 708 may correspond to thumbnails for other respective items being offered for sale by the host during the live video stream. Each thumbnail that corresponds to a respective layer 706, 708 may generated in a manner to generation of other thumbnails 502, 702. In various embodiments, generating of respective thumbnail layers is not solely limited to detection of an item being sold out. The Live Listings Engine may generate thumbnail layers at any time during the live video stream to provide a viewer(s) with a visual cue that the host has additional items being offered for sale.

As shown in FIG. 8, upon completion of a purchase of the pair of headphones by a viewer, the Live Listing Engine displays a confirmation region GUI 800 over the live video stream GUI 300 of the viewer computer device. In addition, the Live Listing Engine updates the live video stream to include a notification 802 that identifies the particular viewer that purchased the pair of headphones from the host ("Eli M."). The notification 802 may also include an identification of the item that was purchased. The Live Listing Engine may trigger display of an expansion functionality 804 that, when selected, may display one or more items associated with the thumbnail layers 706, 708.

Figure 9:
FIG. 9 is a diagram illustrating an exemplary environment in which some embodiments may operate.

As shown in FIG. 9, based on the selection of the expansion functionality 804, an item gallery region GUI 900 may be displayed on a viewer's computer device during the live video stream. The item gallery region GUI 900 may include a view of one or more thumbnails that correspond to items currently and/or previously offered for sale by the host. A respective thumbnail may be selected directly from the item gallery region GUI 900 in order to initiate a purchase request for the particular item that is represented by the selected thumbnail.

Figure 10:
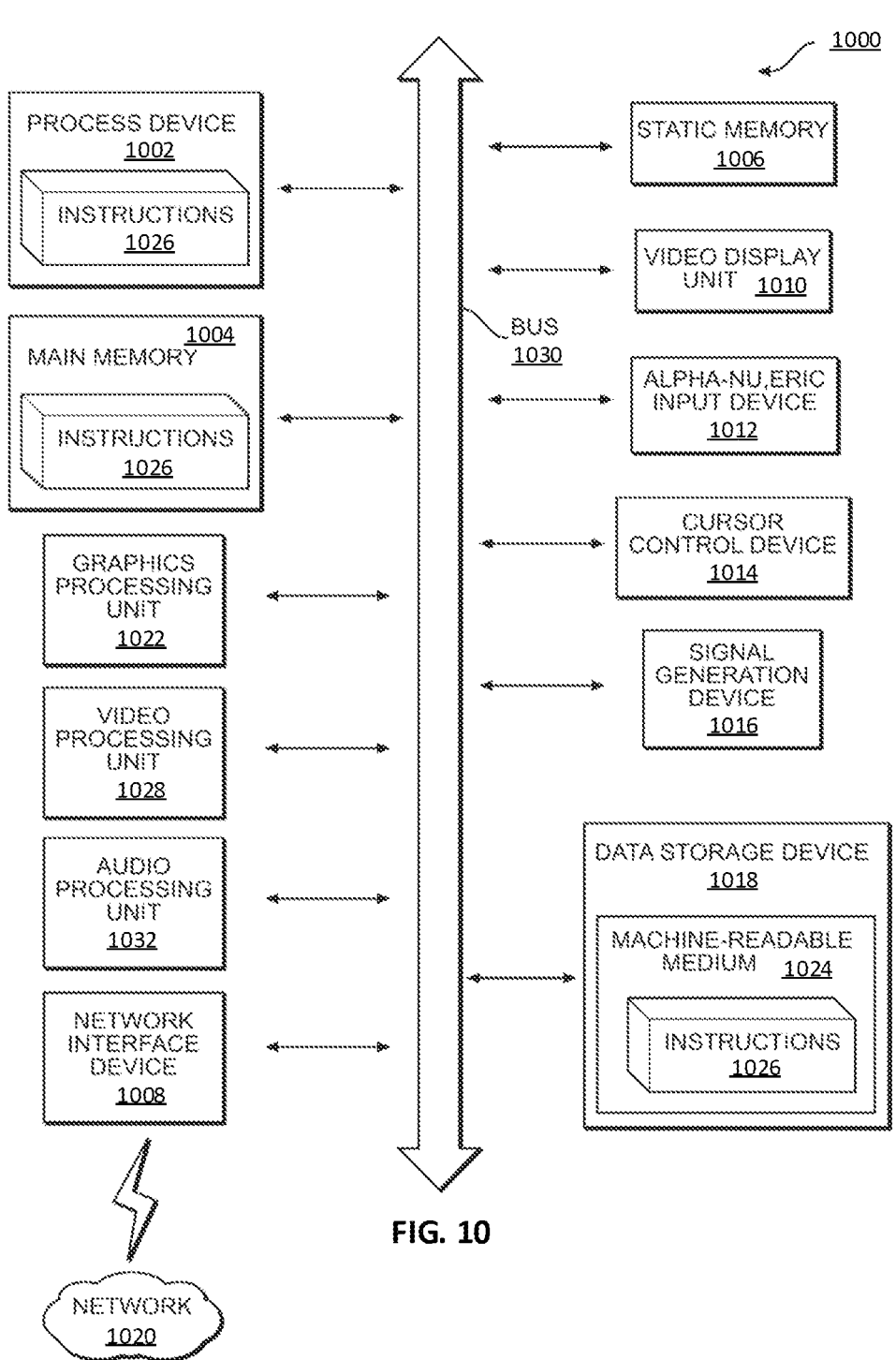
FIG. 10 is a diagram illustrating an exemplary computer that may perform processing in some embodiments.

FIG. 10 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1030.

Processing device 1002 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute instructions 1026 for performing the operations and steps discussed herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a computer-readable medium) on which is stored one or more sets of instructions or software 1026 embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In one implementation, the instructions 1026 include instructions to implement functionality corresponding to the components of a device to perform the disclosure herein. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method, comprising:

receiving an image, from a host computer device, of a camera view of an item captured from an image preview window during a first physical orientation of the host computer device, the image preview window being rendered in a first graphical user interface of a camera software application at the host computer device, the first graphical user interface replacing a second graphical user interface associated with a live video stream application that displayed a portrayal of the item in a current live video stream at the host computer device;

generating a thumbnail based on the image received from the host computer device;

generating a portion of the live video stream based on an adjusted camera view of the item captured at the host computer device, the adjusted camera view of the item corresponding to a second physical orientation of the host computer device caused by at least one adjustment of the first physical orientation of the host computer device;

sending the live stream to a respective viewer computer device, the live stream sent to the respective viewer computer device including portrayal of the adjusted camera view of the item and display of the thumbnail; and receiving an indication of selection of the instance of the thumbnail display in the live stream at the respective viewer computer device.

2. The computer-implemented method of claim 1 wherein receiving an indication of selection of the instance of the thumbnail comprises:

receiving a request to purchase the item portrayed in the thumbnail.

3. The computer-implemented method of claim 1, wherein generating a thumbnail based on the image comprises:

generating at least one graphic overlay associated with the thumbnail.

4. The computer-implemented method of claim 3, further comprising:

wherein the graphic overlay comprises: a graphic overlay inventory indicator indicating whether the item is currently available for purchase.

5. The computer-implemented method of claim 3, further comprising:

wherein the graphic overlay comprises: a graphic overlay price indicator indicating a current sale price of the item.

6. The computer-implemented method of claim 3, wherein sending the live stream to the respective viewer computer device comprises:

sending the graphic overlay with at least a portion of the graphic overlay situated within a boundary of the thumbnail.

7. The computer-implemented method of claim 6, further comprising:

upon detection of a sale of the item, generating updated overlay content; and wherein sending the live stream to the respective viewer computer device comprises: sending the updated overlay content to the respective viewer device.

8. A system comprising one or more processors, and a non-transitory computer-readable medium including one or more sequences of instructions that, when executed by the one or more processors, cause the system to perform operations comprising:

receiving an image, from a host computer device, of a camera view of an item captured from an image preview window during a first physical orientation of the host computer device, the image preview window being rendered in a first graphical user interface of a camera software application at the host computer device, the first graphical user interface replacing a second graphical user interface associated with a live video stream application that displayed a portrayal of the item in a current live video stream at the host computer device;

generating a thumbnail based on the image received from the host computer device;

generating a portion of the live video stream based on an adjusted camera view of the item captured at the host computer device, the adjusted camera view of the item corresponding to a second physical orientation of the host computer device caused by at least one adjustment of the first physical orientation of the host computer device;

sending the live stream to a respective viewer computer device, the live stream sent to the respective viewer computer device including portrayal of the adjusted camera view of the item and display of the thumbnail; and receiving an indication of selection of the instance of the thumbnail display in the live stream at the respective viewer computer device.

9. The system of claim 8, wherein receiving an indication of selection of the instance of the thumbnail comprises:

receiving a request to purchase the item portrayed in the thumbnail.

10. The system of claim 8, wherein generating a thumbnail based on the image comprises:

generating at least one graphic overlay associated with the thumbnail.

11. The system of claim 10, further comprising:

wherein the graphic overlay comprises: a graphic overlay inventory indicator indicating whether the item is currently available for purchase.

12. The system of claim 10, wherein sending the live stream to the respective viewer computer device comprises:

sending the graphic overlay with at least a portion of the graphic overlay situated within a boundary of the thumbnail.

13. The system of claim 12, further comprising:

upon detection of a sale of the item, generating updated overlay content; and wherein sending the live stream to the respective viewer computer device comprises: sending the updated overlay content to the respective viewer device.

14. A computer program product comprising a non-transitory computer-readable medium having a computer-readable program code embodied therein to be executed by one or more processors, the program code including instructions to:

receiving an image, from a host computer device, of a camera view of an item captured from an image preview window during a first physical orientation of the host computer device, the image preview window being rendered in a first graphical user interface of a camera software application at the host computer device, the first graphical user interface replacing a second graphical user interface associated with a live video stream application that displayed a portrayal of the item in a current live video stream at the host computer device;

generating a thumbnail based on the image received from the host computer device;

generating a portion of the live video stream based on an adjusted camera view of the item captured at the host computer device, the adjusted camera view of the item corresponding to a second physical orientation of the host computer device caused by at least one adjustment of the first physical orientation of the host computer device;

sending the live stream to a respective viewer computer device, the live stream sent to the respective viewer computer device including portrayal of the adjusted camera view of the item and display of the thumbnail; and receiving an indication of selection of the instance of the thumbnail display in the live stream at the respective viewer computer device.

15. The computer program product of claim 14, wherein receiving an indication of selection of the instance of the thumbnail comprises:

receiving a request to purchase the item portrayed in the thumbnail.

16. The computer program product of claim 14, wherein generating a thumbnail based on the image comprises:

generating at least one graphic overlay associated with the thumbnail.

17. The computer program product of claim 16, further comprising:

wherein the graphic overlay comprises: a graphic overlay inventory indicator indicating whether the item is currently available for purchase, upon detection of a sale of the item, generating updated overlay content; and wherein sending the live stream to the respective viewer computer device comprises: sending the updated overlay content to the respective viewer device.

* * * * *